Patented Dec. 20, 1938

2,140,650

UNITED STATES PATENT OFFICE 2,140,650

METHOD OF MAKING ARTICLES OF CERAMIC BONDED GRANULAR MATERIAL

Charles H. Quick, Worcester, and Milton F. Beecher, Holden, Mass., assignors to Norton Company, Worcester, Mass., a corporation of Massachusetts No Drawing. Application January 29, 1934, Serial No. 708,806

5 Claims. (Cl. 51—278)

This invention relates to the manufacture of articles of ceramic bonded granular material, and more particularly to articles which are made of granules of refractory material, such as crystalline alumina and silicon carbide, bonded into an integral, open, porous structure by a vitrified ceramic material, and to a method of making the same.

Articles of ceramic bonded, refractory, granular material, such as grinding wheels, porous plates, tiles, refractory bricks and the like, are often required in a highly porous or cellular structure. For example, a vesicular or cellular structure is often desirable in a refractory brick in which the granular material has highly refractory characteristics, such as zirconia, magnesia, crystalline alumina or silicon carbide, and which is adapted for refractory linings where a saving in weight would be to advantage, or is used as heat insulating blocks or other articles which depend upon their high porosity for heat insulation. In particular, the invention applies to abrasive articles which require a definite and predetermined porosity, and it permits the manufacture of a grinding wheel having a highly porous, cellular structure which is especially desirable for certain special grinding operations in which the character of the work being ground requires a soft acting wheel which is capable of wearing away rapidly. In a grinding wheel of this type, the abrasive grains are so disposed throughout the grinding body as to be widely spaced apart from each other and so distribute their cutting effect. This wide grain spacing further serves to weaken the walls of the bond by the expansion of the pores, thereby enabling the wheel structure to be crushed readily and thus form a fast cutting wheel.

It is well known in the art that such ceramic articles of bonded granular material having a porous or cellular structure have commonly been made by the expedient of incorporating into the mixture of abrasive or refractory grains and bond and mixing therewith large particles of a solid combustible filling material, such as 10% by weight of coarse particles of sawdust, which were burned out to a greater or less extent during the firing process, thereby leaving pores or voids in the wheel structure. However, since such a material requires being removed by oxidation of the carbon by air which penetrates the mass, it is seldom completely removed, with the result that usually a carbonaceous residue remains in the body. Furthermore, the sawdust is fibrous in structure and is not usually finely divided, and the particles are not of uniform size or substantially of equal dimensions. As a result, it is difficult, if not impossible, to produce articles having a substantially uniform, porous structure.

Grinding wheels, and particularly those of the soft grinding grades which have a low bonded strength, have heretofore been made by means of the "puddling process", which consists in mixing the abrasive grains, such as silicon carbide or crystalline alumina grains, and the raw ceramic bond, such as a mixture of clays and other ceramic materials, with the required amount of water to form a fluid mass of a good consistency for pouring or casting. In such a mixture the grains and bond assume a natural packing under influence of gravity in which the grains lie substantially in contact with one another if the bond content is low or are spaced slightly apart as required by the amount of bond employed. This mixture is then poured into suitable forms of the desired shape and allowed to dry. Thereafter, the dried bodies are shaved to the required dimensions, and the articles then fired to vitrify the bond.

The requirements of the industry have necessitated using grinding wheels of different grinding capabilities, which are dependent upon the character of the work to be ground, so that it is necessary that grinding wheels be manufactured which differ in their grades of hardness and structure or volume percentages of abrasive, bond and pores. It has not been possible heretofore to manufacture grinding wheels by the "puddling process" and obtain a predetermined structure, owing to various manufacturing difficulties.

Heretofore, it had been assumed that the final fired structure and other characteristics of the puddled wheels were adequately determined by taking into account the respective weights of the abrasive grains, bond and water which were initially introduced into the mixing kettle. It has been found that instead of a wet mixing being obtained having a wet weight per unit of volume corresponding to the wet weight density, which can be calculated from the weight proportions of the ingredients added to the mix and which give a predetermined fired structure in the article, the wet weight density of the mix would vary irregularly instead of constituting a fixed and predetermined amount.

Due to the fact that the raw mass is in a fluid condition during the molding operation, it has not heretofore been found possible to control the porosity of the cast body, and the pores which were ultimately obtained in the fired article were represented mainly by the water which was present in the molded mass, together with such air as had been entrapped or entrained in the mass during the mixing operation. The structure of a grinding wheel is definitely determined by the volume percentage of the pore spaces present in the body, as well as the volume percentages of the grains and bond employed. Hence, unless one can predetermine and measure the volume percentage of pores, the final structure cannot be controlled and the fired wheel made from such wet puddled mixings will have an unknown and variable structure.

Wheels of controlled structure and grinding characteristics have had to be made heretofore by a dry pressing method in which the abrasive grains and bond are mixed together in such a semi-dry condition that pores between the particles of the dry constituents will remain in the mass and their final volume can be predetermined by pressing the mass to any desired extent. However, there are many advantages to be found in the puddled wheel process and it has, therefore, been highly desirable that a method be devised which would permit one to make a puddled wheel of a desired pore volume and predetermined final structure and to control that pore volume within required narrow limits during the wheel manufacturing operations. Hence, since the water in the mass is evaporated therefrom during the bond maturing operations, it is therefore essential that the volume of the pore spaces which have been previously occupied by that water as well as the entrained air therein before the mass is matured must be taken into consideration in determining the final structure characteristics and ultimate pore volume of the fired article. Consequently, any process which controls the pore volume of a puddled wheel must take into account both the water and the air contents present in the wet mix.

It is accordingly one object of this invention to overcome these difficulties and to provide a ceramic article of bonded granular material having predetermined percentages of grains, bond and pores which may be readily varied as desired during the process of forming the same.

A further object is to provide a method by which porous articles of ceramic bonded granular material may be made by the puddling process from a highly fluid mixture of grains, bond and water and an article having any required porosity or volume percentages of grain, bond and pores may be produced. Further objects will be apparent in the following disclosure.

This invention comprises a method of making articles of ceramic bonded, refractory or abrasive granular material having an open, porous, cellular structure and of a predetermined porosity by the "puddled process", which comprises pouring or casting a plastic, fluid mixture of the granular material and a raw ceramic bond into forms of the desired shape, in which one may predetermine the volume percentages of grains, bond, and pores in the fired article. This involves determining the volume percentages of water and gas in the wet mass, as well as those of the bond and grains, which are required to provide the desired volume structure in the final fired body, taking into account the various weights and volume changes involved during the drying and bond maturing operations. To obtain the required pore volume, the wet mix is provided with water and gas in amounts which have been precalculated as being sufficient to leave the required pore volume in the fired article after evaporation of the water and shrinkage of the mass during drying and firing. To this end, one employs predetermined weight percentages of the grains, bond and water and mixes therewith air or other gas in a quantity required to give a mixing of a definite wet weight per unit of volume which is precalculated so that the matured mixture will have the required fire weight per unit of volume, and the final article will have a predetermined volume percentage of bond, grains and pores, in which the pores in the fired structure constitute the voids which were previously occupied by water and gas.

To prevent escape of the precalculated gas content from the unfired wet mass, the process is so carried on as to disperse the gas uniformly throughout the mass as bubbles in the nature of a foam or a froth and then to stabilize the distributed gas phase in the wet mass so that the cellular formation of the bubbles will be preserved during the subsequent drying and bond maturing operations and thereby produce the cellular and vesicular structure desired in the finished, matured article. The gas is preferably incorporated in the mass by a stirring or beating operation, which serves to draw the gas into the mass as bubbles and to mix or disperse them uniformly therein; but other suitable methods may be employed for the purpose. The bubbles are stabilized in that condition, when sufficient gas has been incorporated, by means of an agent which acts upon the wet clay and water mass surrounding the gas bubbles to hold the froth rigid enough to support the weights of the adjacent grains and bond and also preserve the bubble formation contained in the wet mass. As an example of suitable stabilizing agents capable of holding air or other gas bubbles in place in the wet mass, it is preferred to employ such substances as a water extract of sawdust, sulphonated castor oil, saponin, licorice and soap tree bark.

In carrying out the invention in practice, it is necessary to first determine the respective specific gravities and weight losses during the drying and firing operations of the particular constituents used. After this, a determination is then made of the volume changes of the whole article, which arise during the drying and firing steps, for the particular kind and characteristics of bond employed, as well as for the shape, size and spacing of the grains used. The invention seeks to produce a puddled grinding wheel or other article having definite volume percentages of grains, bond, and pores. In order to attain this result, it is now possible, from a table of factors, which involve determinations of specific gravity as well as weight and volume changes during the drying and bond maturing operations, to determine the initial weights and volume percentages of the respective ingredients of the wet mix which constitute the wet volume structure thereof required to produce a definite, final, fired volume structure in the finished article.

Therefore, the yardstick by which the wet and fired structures are measured is indicated in terms of the weight per unit of volume; hence, the initial calculations of the mix are so made as to determine that weight per unit of volume of the wet mix which will shrink, during the subsequent drying and firing of the body, to produce a body having a definite fired weight per unit of volume which represents the desired volume percentages of abrasive, bond, and pores in the fired wheel.

This invention is particularly applicable for producing the openness of structure and porosity required for the softer grades of grinding wheels and for porous plates, bricks, etc. Also, this air content serves to influence and greatly improve the mixing and pouring consistency of the wet mix. A good mixing and pouring consistency of the puddled mixture is obtained where there is a sufficient volume of bond and water present in the mix to completely fill the voids between the abrasive grains and to force them far enough apart so that they will slide over one another in the mixing kettle during the stirring and mixing process.

As an illustration of the advantages derived from the use of air in the mix, a mixture composed of #36 and #46 grit abrasive grain mixed with from one to one and a half ounces of standard ceramic bond per pound of abrasive material and puddled without the stabilized air is found to require such large amounts of water to obtain a satisfactory mixing consistency that the strength of this fluid mass of water and bond will no longer be of a consistency capable of supporting the abrasive grain in suspension during the pouring process or in the poured mass after it has been cast into the forms. Hence, with such a mixing there results a segregation of the ingredients in the mixing kettle, a rapid settling of abrasive material as soon as the wet mixture has been poured into the form, due to the different specific gravities of the various materials, and a final finished product which is of too dense structure. On the other hand, by using stabilized air in sufficient quantity in the same mixture, less water is required to produce a mix having a good pouring consistency, since the air not only expands the bond and water mix to a volume sufficient to fill the voids between the abrasive grains, but acts to convert the liquid bond and water mass into an emulsion of a consistency capable of holding the grains. The air bubbles are held and remain in suspension in the mixture during mixing and pouring of the mass and until the poured wheel has become partially hardened during the drying process, and thereby results in forming the openness of structure and the abrasive packing desired in the matured product.

In order to take advantage of this discovery and to introduce determined volumes of gas into the mixture so as to produce a final product having a desired porosity and structure, it is therefore proposed to sample the mixture frequently during the step of incorporating the gas in the ceramic mass, and measure the quantity of gas which is thus added and then stop the operation at the indicated point. The measurement of the structure of the wet mixing is determined as the weight per unit of volume of the wet puddled mixture, which is proportional to or is a measurement of the fired weight per unit of volume and grade of the finished matured wheel. In other words, the structure found in the finished wheel can be traced to the structure of the wet mixture as poured from the mixing kettle. This unit weight determination permits one to calculate the volume percentage of gas in any mixing where the volume composition of the wet mixture as measured in terms of weight, and the respective specific gravities of the various constituents, i. e. grains, bond and water, are known. It will now be seen that it is no longer practical to identify puddled mixings by their composition by weight, but that the volume percentages of the various ingredients must be used in the determination of their wet composition.

It has been further observed that the amount of gas which can be incorporated in a wet mixing by a beating or stirring action can be influenced and varied by the manner in which the ingredients of a mix were introduced into a mixing kettle. In accordance with the preferred process, the mixing procedure should be so carried on that all the water is introduced into the mixing kettle before or when the last amount of the dry materials is added, and that no water should be added later, after the required quantity of the dry constituents of the mix has been put into the kettle, because the excess water would never be mixed in thoroughly with the mix. In other words, it is preferred that when the ingredients of a mix are added to the mixing kettle, they should be so introduced therein that the mixture remains relatively thick during the time in which the materials are being added, so that more air may be entrapped between the dry bond and grain particles at the time they are introduced into the mixing kettle. In such a case, the quantity of air will be proportional to the excess volume of the dry constituents over the volume of water incorporated. To understand this readily, it must be realized that before the mixing process is started on a mix containing an air stabilizing ingredient, there is not sufficient water to cover all the bond and abrasive material present. It is only after the mixing operation has been carried on for a short time that the air bubbles, which have been formed in the mix by the stirring action, act to swell the volume of the fluid mass of bond and water undergoing mixing, and that the liquid level covers all the abrasive grains and produces a mass having sufficient strength to hold the grains in suspension therein and of a good mixing and flowing consistency.

It will now be seen that the structure of the wet mixture and the grade and structure of the fired article are dependent upon several different variables, namely, the amounts of air, bond and water as well as grains present in the mix. These variables are closely interrelated, and it is a combination of all of these factors which determines the final grade and structure of the matured wheel. The particular bond content to be used for a particular grade and structure of puddled grinding wheel cannot be specified unless the air and water content required therefor is also designated. The air content of the mix is controlled and the desired final structure for any particular grade of wheel is obtained by finding the proper bond and water content which combines with this air content. The dry material and water are added at a fixed rate, entrapping an amount of air which will give the proper structure to the mix in the wet stage.

The air which is thus deliberately introduced in a predetermined quantity into the mix is the air which is entrapped between the dry bond and abrasive particles at the time they are introduced into the mixing kettle and dispersed throughout the mixing by the stirring action of a rotatable stirring element within the kettle. In practice, the dry ingredients, viz., the abrasive grains and bond, are preliminarily mixed thoroughly with the air stabilizing material, and this mixture is then introduced along with the water into a mixing machine, preferably of a type well known in the art in which a set of mixing paddles or blades is disposed within the mixing kettle and adapted for rotation therein in opposite directions at a required rate. The mass is then acted upon by the mixing blades which produce a stirring together of the ingredients, during which operation the blades also act to stir and fold air into the spaces between the globules composing the mass undergoing mixing. This stirring action and relative movement of the mixing paddles is continued for a sufficient time until a stage is reached where there is formed a dispersion of phases of air, bond and water, thereby resulting in the production of a fluid, plastic mass of bond and water into which is dispersed an internal phase of stabilized air bubbles. This stabilized condition of the air is produced with the aid of a small quantity of an air stabilizing substance, as above mentioned, during the dispersion and agitation of the mass in the mixing machine, in which the mixing blades served to stir the mass and so mingle the ingredients as to present an increasing number of air bubbles for contact with the stabilizing agent. The thus stabilized air bubble formation in the wet mixing minimizes or prevents any tendency for the abrasive, bond and water to segregate during the mixing operation.

In order that the invention may be better understood, the following specific examples are given by way of further illustration of its practice:

*Example I*

Twenty-four pounds of crystalline alumina having a grit size of 46 meshes to the linear inch are mixed with 1½ pounds of the standard ceramic bond used in this art, which ordinarily comprises ball clay, slip clay and feldspar. To the mixture is added 1 cc. of sulphonated castor oil. These materials are thoroughly mixed together and then 2 liters of water are added and the fluid mass is placed in a mixing machine, preferably of the type having oppositely rotatable mixing paddles, and stirred thoroughly and for a sufficient time to obtain a fluid mass of the desired consistency and wet weight density, as previously determined to form the particular porous structure required in the final article. This stirring action is preferably slow, but the mixing paddles are of such character that they serve to introduce a considerable quantity of air into the mix and form a foam or froth of air cells or bubbles interspersed throughout the fluid mass and which are stabilized by contact with the sulphonated castor oil during agitation of the mass. This foam-like structure is thus maintained in a stable condition during the subsequent shaping and firing operations and until the bond is finally matured to obtain the finished ceramic product. This air phase tends to influence the density of the wet mix; hence, stirring is continued until the wet mass has entrained sufficient air therein to obtain a precalculated wet weight per unit of volume, as determined by repeatedly taking samples from the mixing kettle and determining the weight of a known volume. The density of the wet mixture will be 2.23 grams per cubic centimeter for the particular wheel structure described. This method of introducing the air stabilizing ingredient into the mix in a liquid form permits a much more uniform and complete distribution in the mass than is possible where dry, solid particles are incorporated. This fluid, plastic mixture may then be poured into forms of the desired shape, dried and matured, in accordance with the standard drying and firing practice in the art, to form a final finished product having a predetermined porous structure in which the volume percentages are: abrasive 49.1% by volume; bond 4.3% by volume; and 46.6% pores.

*Example II*

Four hundred eighty pounds of crystalline alumina having a grain size of 46 grit (i. e., which will just pass through a screen having 46 meshes to the linear inch) are mixed with 22.5 lbs. of ceramic bond, such as the standard clay-feldspar bond used in this art, and 5⅜ ounces of sawdust having a particle size which will pass through a screen of 60 meshes to the linear inch. This material is then mixed to a fluid condition by the addition thereto of 66.5 lbs. of water, while stirring the mass thoroughly and for a sufficient time to entrain the proper amount of air therein and to obtain the desired pouring consistency. This air phase tends to influence the density of the wet mix; hence, stirring is continued until the wet mass has entrained sufficient air therein to obtain a precalculated wet weight per unit of volume, as determined by repeatedly taking samples from the mixing kettle and determining the weight of a known volume. The density of the wet mixture may be precalculated as 1.89 grams per cubic centimeter, for example. The fluid mass is then poured or cast into suitable forms of the desired shapes and allowed to dry and harden. The dried shape is then fired to vitrify the bond, according to standard practice. A wheel made from such a mixture will have the following volume proportions: abrasive 42.5% by volume; bond 2.8% by volume; and pores 54.7% by volume.

At the start of the mixing process, the amount of water employed is insufficient to cover all of the bond and abrasive particles, but after the mixing operation has been carried on for only a short time the air bubbles have become formed and stabilized and have swelled the bond and water slip to a volume sufficient to fill the voids between the grains so that the liquid level in the mixing container covers all of the ingredients and thus presents a good mixing of uniform pouring consistency. The air remains stabilized in the mixture until the wheel has partially set during drying and the openness of the abrasive packing desired is obtained.

The air bubbles are not contributed by the sawdust per se but are stabilized by the water extract thereof. This air which is thus stabilized may be the air which is normally present between the dry bond and grain particles at the time they are mixed with the water, or it may be added in part by the stirring blades. The amount of sawdust used may be varied in accordance with the size of the mixing being made and the degree of porosity to be obtained. However, it is found that the proportion of sawdust which will stabilize the air bubbles in the puddled mixing is low and of the order of 7/100 of one per cent (0.07%) by weight of the abrasive weight of the composition. In the past, the quantity of sawdust which has heretofore been employed as a bulk filler and which on being burned out served to produce the voids of the porosity required was used in an amount which was appreciably high, the proportion being of the order of from 1½% to 10% by weight of the abrasive weight employed. In such prior practice, there was no attempt made to stabilize air bubbles within the mix or to control the volume content of air therein, and the sawdust was used merely as a combustible filler which upon burning out left its equivalent volume of pores. According to the present invention, the water extract derived from the sawdust serves to make pores of far greater total volume than the volume of the sawdust, because of its ability to stabilize the froth of air and water produced by stirring the mass. Either the dry sawdust or its water extract may be added to the abrasive and clay mixture.

*Example III*

Sixteen pounds of crystalline alumina grains having a grit size of 46 meshes to the linear inch are mixed with 1 lb. of standard clay-feldspar bond and 50 cc. of an aqueous licorice solution. This licorice solution is prepared by boiling 10 grams of commercially obtainable licorice extract in powdered form in 100 cc. of water. The abrasive, bond and licorice solution are mixed together, and the resulting mixture is then thoroughly mixed with 1330 cc. of water and stirred until a mass of the desired plasticity and volume content of air is obtained. The wet mixture is then poured or cast into forms of the desired shape and dried, after which the hardened article is matured in accordance with the standard puddled practice to form the final porous product.

*Example IV*

Eight pounds of silicon carbide grains having a grit size of 60 meshes to the linear inch are mixed with 4 lbs. of standard clay-feldspar bond and 5 grams of saponin. To this mixture is added 3.2 lbs. of water, and the mass stirred until it is reduced to a plastic, fluid consistency of the required wet weight per unit of volume which has been precalculated to give the required weight per unit of volume of the fired article. This wet mixing may then be poured or cast into suitable forms, dried and matured in accordance with the well-known puddled practice to form a final article having a predetermined structure and porosity.

*Example V*

Sixteen pounds of crystalline alumina grains having a grit size of 46 meshes to the linear inch are mixed with 1 lb. of standard ceramic bond and 100 cc. of a water extract of soap tree bark. This extract is prepared by treating 50 grams of soap tree bark with 350 cc. of boiling water, allowing it to stand, filtering the solution, then treating the residue with 350 cc. of boiling water, allowing this solution to stand, filtering the solution and then combining both of the filtrates and adding 100 cc. of the resulting solution to the abrasive and bond, as above explained. To the mixture of abrasive, bond and soap tree solution is added 1167 cc. of water, and the mass stirred in order to thoroughly mix the mass and to obtain the desired plasticity and air content. The wet mass is then poured into suitable forms and allowed to harden, after which the dried articles are fired in accordance with the standard firing practice in the art to form the finished products of a predetermined structure.

It will be appreciated that in practice, with a constant and proper amount of stabilizing material for air present in the mix, there are several other variable factors which tend to influence the air content and wet weight per unit of volume, and which are as follows:

1. If the dry ingredients are introduced into the mixing kettle at a rate faster than water is added, then more air is entrapped in the mixing and a lower wet weight per unit of volume and softer wheels are obtained. This effect is found to be more pronounced as the rate of adding the dry material is increased. Also, if water is added to the mixing kettle at a rate faster than that at which the dry ingredients are introduced, then less air is entrapped in the mixing and a higher wet weight per unit of volume and consequently harder wheels are thus obtained. However, this latter procedure is the preferred practice, since it can be more easily duplicated from one time to another than can the former method; and, in addition, it is found to produce a substantially uniform and homogeneous mixture throughout the mixture kettle. It may also be observed that practically all the air is entrapped in a mixing during the early stages of the mixing operation; hence, the amount of air used may be roughly gauged by the duration of the mixing operation.

2. The density of the wet mix is found to be directly proportional to the water content used. In other words, the larger the water content in the wet mix, the higher the wet weight per unit of volume and the lower the air content therein, and vice versa. This effect is found to be independent of the filling procedure employed.

3. It is found that the density of the wet mix is influenced by the bulk density of the granular material employed. For instance, the heavier the grain, the higher the wet weight per unit of volume and the lower the air content of the mixing. This effect is due to the difference in shape of grain, as measured by the weight per cubic foot value, rather than to any difference in weight per cubic foot of the material itself. As an example for the purpose of illustrating this effect, a mixture is made of 1 lb. of crystalline alumina grains of 46 grit size mixed with $1\frac{1}{16}$ ounces of bond, sawdust 0.07% by weight of the abrasive content of the mass, and gum tragacanth 0.1% by weight of the bond content thereof.

| Weight/cubic feet of abrasive | Wet weight/ volume (gms./cc.) | Volume, percent air |
|---|---|---|
| 120.25 | 2.02 | 19.1 |
| 127.25 | 2.20 | 12.0 |

To make a wheel of high porosity, it is preferable, therefore, to employ grain of the lighter weight per unit of volume, due to the effect on shrinkage and considering the ease with which it may be supported in the wet mixture. It will be understood, of course, that the type of grain selected depends upon the kind of structure to be made, so that a heavier grain may be employed, if desired.

The calculation of the air content incorporated into the wet mix is determined by the volume composition of the wet mixture, as measured in terms of weight, and the respective specific gravities of the ingredients which are employed. As an illustration of the procedure by which the volume structure of a puddled wheel may be predetermined for a mixture composed of 1 lb. of crystalline alumina grains of 46 grit size and 1⅝ ounces of standard ceramic bond with a wet weight per unit of volume of 2.20, and to produce a final volume structure of: abrasive 44.5% by volume, bond 6.4% by volume, and pores 49.1% by volume.

In making such a wheel, it is preferred to select for the abrasive and bond to be used, materials having the following known physical characteristics:

|  | Density (gms./cc.) | | Weight loss upon firing |
|---|---|---|---|
|  | Unfired | Fired |  |
|  |  |  | *Percent* |
| Abrasive (crystalline alumina) | 3.90 | 3.90 | 0 |
| Bond | 2.70 | 2.50 | 9.6 |

It is found by experience that there will be some volume shrinkage of the body as a whole which takes place during drying and firing of the mass, depending directly upon the materials used and upon the procedure employed. With the particular materials disclosed and in accordance with the particular practice set forth, it is found that to obtain a finished product composed of 44.5% by volume of abrasive, it will be necessary for the wet mixture in the puddling machine to be composed of 42.2% by volume of abrasive. With different materials and practice, the amount of this volume shrinkage would vary, as determined by direct measurements thereof.

The first step now would be to add sufficient water to the abrasive and bond employed so that the resultant mixture would be composed of the desired 42.2% by volume of abrasive. Since the customary way to proportion such ingredients is by weight, the composition, by weight, of the unfired mixture which must be used to give us the desired composition by volume of the fired product will be calculated as follows:

Parts by weight of abrasive unfired = (parts by volume of abrasive fired) × (density of abrasive fired) ÷

$$\frac{(100 - \text{percent weight loss})}{100} = \frac{44.5 \times 3.90 \times 100}{100 - 0} =$$

174 parts by weight of abrasive

Parts by weight of bond unfired = (parts by volume of bond fired) × (density of bond fired) ÷

$$\frac{(100 - \text{percent weight loss})}{100} =$$

$$\frac{6.4 \times 2.50 \times 100}{100 - 9.6} =$$

16.67 parts by weight of bond

To these proportions by weight of unfired bond and abrasive, sufficient water is added in order that the resultant mixture will now be composed of 42.2% by volume of abrasive. This weight of water is determined as follows:

The parts by volume of abrasive (unfired mix) = parts by weight (unfired mix) ÷ density unfired = 174 ÷ 3.90 = 44.5

The parts by volume of bond (unfired mix) = parts by weight (unfired mix) ÷ density unfired = 16.67 ÷ 2.70 = 6.17

The sum of these two is    50.67

Then, the total parts by volume for the complete mixture including water must be such that 44.5 parts by volume of abrasive shall equal 42.2% of the total volume, or that the total volume =

$$\frac{44.5 \times 100}{42.2} = 105.5 \text{ parts by volume}$$

The volume of water, therefore, equals the total volume less the volumes of abrasive and bond or = 105.5 − 50.67 = 54.83. Since water has a density of 1, these 54.83 parts by volume are also parts by weight of water.

If one now takes this mixture consisting of:

| | Parts by weight |
|---|---|
| Abrasive | 174.00 |
| Bond | 16.67 |
| Water | 54.83 |
| Total | 245.50 | or

| | Parts by volume |
|---|---|
| Abrasive | 44.50 |
| Bond | 6.17 |
| Water | 54.83 |
| Total | 105.50 | and attempts to mix it according to the usual puddling practice, one finds that the fluid bond-water phase is not capable of supporting the heavy abrasive particles and results in a segregation of the materials in the mix in such a manner as to render mixing and pouring impossible.

Hence, an air phase is, therefore, introduced into the mixing by using an air bubble stabilizer. This is done, for example, by using sawdust as the air stabilizer in an amount equal to 0.07% of the abrasive weight and replacing a suitable volume of water with an equal volume of air. If sulphonated castor oil is used as the air stabilizing agent, it may be employed in the proportion of 1 cubic centimeter of the material to 2 liters of water. With the particular mixture described above, it is now found that the substitution of 13.03 parts by volume of air for the same volume of water gives the necessary pouring and mixing characteristics. Consequently, the amount of water used is reduced from 54.83 parts to 41.8 parts, by volume, (or by weight, since water has density of 1) and the composition of the new mixture then becomes:

| | Parts by volume | Percent by volume |
|---|---|---|
| Abrasive | 44.5 | 42.2 |
| Bond | 6.17 | 5.9 |
| Water | 41.80 | 39.5 |
| Air | 13.03 | 12.4 |
| Total | 105.50 | 100.0 |

The volume of sawdust or other stabilizing agent is less than 0.3% and hence, may be neglected.

The air in this mixture is gradually introduced by the whipping action of the mixing paddles as the mixing operation proceeds, and it is only essential that the mixing be stopped as soon as the proper amount of air has been incorporated. This is done in practice by measuring the density of a sample of the entire wet mixture and from its known composition, by weight, calculating the amount of air present, as shown by the following:

|  | Parts by volume |  | Parts by weight |
|---|---|---|---|
| Abrasive | 44.5 | × its density 3.90= | 174 |
| Bond | 6.17 | × its density 2.70= | 16.67 |
| Water | 41.8 | × its density 1.0 = | 41.80 |
| Air | 13.03 | × its density 0 = | 0 |
| Total | 105.5 |  Total | 232.47 |

The density of this mixture is, therefore, 232.47 parts by weight÷105.5 parts by vol.=2.20 gms./cc. The mixing operation is, therefore, carried on until this density is obtained.

In practice, it is found both possible and desirable to use widely different ratios of air to water in obtaining the desired mixing characteristics. In the above example, the ratio used was about 1 part of air to 3 parts of water, but it may be desirable to use ratios of from 1:8 to 2:1 parts of air to water. The particular ratio used depends upon the kind and size of the abrasive, the kind and amount of bond, and the particular volume structure being made.

The changes which are found to take place in converting the wet mixture to the final fired body comprise the weight and volume changes of the green mass on drying and firing. The drying losses consist of the weight loss of the water in the body and the shrinkage due to the volume change. This volume change depends upon the size and shape of the grains, the grain packing and primarily on the kind of bond. The weight losses consist essentially of the evaporation of water during the drying process and the evaporation and volatilization of water and other materials during firing.

In order to make the various articles in accordance with practical methods and to control the structure during the manufacturing operations, predetermined charts may be established which show the desired wet weight per unit of volume limits for the required grades and the various kinds of abrasive or refractory grains used. Thus, if one wishes to make an article having a desired structure and wet weight per unit of volume, as shown by the chart, then the procedure is to sample each mixing before pouring and determine its wet weight per unit of volume and to stop the step of incorporating the gas when the required weight is obtained.

It is feasible to increase and to control the pore structure of the article, as desired, to any predetermined assigned amount by the incorporation, regulation and stabilization of a measured quantity of gas bubble phase which is introduced initially into the wet mixing. It is also to be understood that, in its broader aspects, this invention applies to articles which are not made by the controlled structure method above described. It is feasible to obtain an article of required porosity by cut-and-try and other unscientific methods, in which the degree or volume of porosity is determined by observation of the finished product or by any other suitable scheme. The invention is, therefore, applicable to the production of an article of a desired porosity, whether high or low, which is made by stabilizing a gas bubble phase within a puddled mixture of grains, water and ceramic bond by means of suitable stabilizing agents, which fix the porosity and cause the grains to be held in suspension until the bond can be matured. By following a duplicate procedure, it is now possible to obtain substantially duplicate articles, as distinguished from the haphazard methods of the past which produced variable porosities because of the lack of stabilization of the gas phase and its consequent changing in volume during the process. From this viewpoint, it is immaterial how the gas is incorporated in the mixture, so long as a required amount is stabilized in the wet mass and the porosity is thereby made definite. It is also obvious that the numerous silicate or ceramic bonds employed in the art to make puddled mixes may be employed; whether they be synthetic silicates, such as sodium silicate mixed with clay, which can be employed in the puddled process or whether they be natural raw clays with feldspar, kaolin, flint, etc. as are commonly used for grinding wheel or refractory bonds. The terms "ceramic bond" and "vitrify" as herein used are to be interpreted broadly as covering bonds which are suitable for use in the puddled process and the step of hardening the bond sufficiently to fix the granular material in an integral body capable of practical use, whether or not the bond has been heated to a point of vitrification as required for making glass or a porcelain.

While the claims are not to be limited to any particular theory as to the formation of the pore structure, it is believed that the air bubbles within the article are formed at least in part as globular cells wholly enclosed and stabilized within the raw bond-water mass, and that because of this condition it is possible, by this replacement of some of the water by air, to expand the fluid bond-water mass to hold the abrasive grains apart and support them in the wet mix. It is desirable, therefore, that the wet mix be so compounded that all of the dry materials are coated with water and bond within which air is present as globular cells and that the mixture be sufficiently fluid so as to be capable of being poured. The volume or number of these closed cellular pores will, of course, depend upon the quantity of bond present and the conditions of manufacture. It is, however, considered that in an article having a high bond content, there is a considerable volume percentage of these closed globular cells, and that the ability of the air cells to cause the fluid mass to hold the grains widely spaced lies partly in increasing the surface tension of the plastic clay-water coating which forms the skin or surface material surrounding the air bubbles. It is also considered that during the step of firing the article, these enclosed air globules or cellular spaces within the bond produce a porous, honeycombed condition of the bond and so makes a soft, friable article.

It is to be observed, however, that this swelling of the bond-water mass is carried on to a precalculated extent, and that through the use of a predetermined volume percentage of air, the amount of swelling of the wet mixing under conditions of manufacture will be predetermined, and that the air phase thus determined, when taken in connection with the volume percentages of the ingredients in the raw mixture, serves to determine the final volume structure of the fired body. Hence, this method permits of substantially accurate control of the porosity of the fired product.

While the invention has been specifically described as adapted to the manufacture of a puddled abrasive wheel, it will be obvious to those skilled in the art that it is applicable to other articles of ceramic bonded granular material of sufficient refractoriness to withstand the firing temperature of the kiln required to vitrify or mature the bond, and in which the same or similar structures and characteristics are desired, and that other materials and proportions than herein called for may be used to suit the particular conditions which may be involved in the case. For example, one may make in accordance with this invention refractory bricks, porous plates, filters, etc. of ceramic bonded alumina, silicon carbide, magnesia and zirconia, while quartz or other forms of silica, as well as various natural silicates, such as the spinels, garnet, beryl, etc., may be employed in the manufacture of numerous articles, such as tiles and plates. The bond composition will, of course, be modified in accordance with the requirements of the particular granular material selected, as is well known in the art. A magnesium-aluminum spinel may be bonded with a mixture of 22 per cent of feldspar, 10% of ball clay and 13% of slip clay, but a grain of lower refractoriness, such as beryl, may require a bond of lower maturing temperature, such as a mixture of 7 parts by weight of sodium silicate, 1 part of zinc oxide and 2 parts of slip clay, used with 80 parts of beryl, or in other suitable proportions. Such modifications or substitutions of the invention as lie within the scope of the claims appended hereto are, however, to be considered as embodied within the above specification.

Having thus described the invention, what is claimed as new and desired to secure by Letters Patent is:

1. The method of making an article of ceramic bonded granular material which comprises, in addition to selecting the required size and kind of grains and the type of ceramic bond to be used, the steps of measuring out accurately those quantities of the grains and the raw bond, taking into account the shrinkages involved in firing the mass, which will respectively occupy predetermined volumes in the final fired product, mixing the raw bond and grains with that amount of water which will provide the required viscosity to hold the grains in suspension in the water and bond but insufficient to form a castable fluid mass and dispersing and stabilizing gas therein in an amount required to make a castable fluid mass of that weight per unit of volume of the wet mass which will give the required density of the fired article, the final pore volume being determined by the volume occupied by the gas and water in the wet mass, thereafter pouring the mass into a mold and casting an article therefrom, drying the article and firing it to mature the bond.

2. The method of claim 1 in which air is beaten into the fluid mass of grains, bond and water only until a sample of the mass shows the required weight per unit of volume.

3. The method of claim 1 in which the grains and bond are introduced in a dry condition to a mixing machine while air is beaten into the mass, and all of the water is introduced by the time that all of the dry material has been added.

4. The method according to claim 1 in which the grains of the required kind are so selected as to their shapes that an article of high porosity is obtained by using grains of low weight per unit of volume.

5. The method of making an article of ceramic bonded granular material of required volume percentages of grains, bond and pores comprising the steps of measuring out those quantities of the grains and the raw ceramic bond, taking into account the shrinkages involved in drying and firing the article, which will occupy the required volumes in the final article, incorporating therein that amount of water which will provide the required viscosity for holding the grains separated and in suspension in the water and bond but insufficient to form a castable fluid mass and dispersing and stabilizing a gas therein to form a pourable and castable fluid mass, sampling the fluid mass and stopping the dispersion of gas therein when its weight per unit of volume is such that, after drying and firing the article, the latter will have the required weight per unit of volume, wherein the final pore volume is determined by the volume initially occupied by the water and dispersed gas, thereafter pouring the mass into a mold and casting an article therefrom, and drying and firing the article to mature the bond.

CHARLES H. QUICK.
MILTON F. BEECHER.